(12) United States Patent
Christen et al.

(10) Patent No.: US 9,720,087 B2
(45) Date of Patent: Aug. 1, 2017

(54) METHOD AND DEVICE FOR DETERMINING AN ORIENTATION OF AN OBJECT

(71) Applicant: LEICA GEOSYSTEMS AG, Heerbrugg (CH)

(72) Inventors: Andreas Christen, Erlinsbach (CH); Konrad Wildi, Unterentfelden (CH); Albert Markendorf, Walde (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 182 days.

(21) Appl. No.: 14/440,063

(22) PCT Filed: Oct. 29, 2013

(86) PCT No.: PCT/EP2013/072602
§ 371 (c)(1),
(2) Date: Apr. 30, 2015

(87) PCT Pub. No.: WO2014/067942
PCT Pub. Date: May 8, 2014

(65) Prior Publication Data
US 2015/0301179 A1    Oct. 22, 2015

(30) Foreign Application Priority Data
Oct. 31, 2012    (EP) .................................... 12190873

(51) Int. Cl.
*G01S 17/42*    (2006.01)
*G01S 17/02*    (2006.01)
(Continued)

(52) U.S. Cl.
CPC ................ *G01S 17/42* (2013.01); *G01S 5/16* (2013.01); *G01S 7/497* (2013.01); *G01S 17/023* (2013.01); *G01S 17/48* (2013.01)

(58) Field of Classification Search
CPC ......... G01S 5/163; G01S 17/023; G01S 7/497
See application file for complete search history.

(56) References Cited

U.S. PATENT DOCUMENTS 7,180,607 B2    2/2007 Kyle et al.
7,424,174 B2    9/2008 Furuhashi et al.
(Continued)

FOREIGN PATENT DOCUMENTS

CN    102410832 A    4/2012
EP    0 553 266 A1    8/1993
(Continued)

*Primary Examiner* — Luke Ratcliffe
(74) *Attorney, Agent, or Firm* — Maschoff Brennan

(57) ABSTRACT

The invention relates to a method for determining a spatial orientation of an auxiliary measurement object for a laser tracker, said measurement object having reference features which provide points of light. The tracker has a base, a support which can be pivoted in a motorized manner, a pivoting unit which can be rotated about a tilting axis in a motorized manner and which comprises an image capturing unit for capturing an image of the points of light, and a beam source for emitting a laser beam. According to the method, an image is captured in the direction of the auxiliary measurement object with respective capturable points of light, and the spatial orientation of the auxiliary measurement object is derived from image positions in the image for the points of light captured in the image using an image analysis.

18 Claims, 5 Drawing Sheets

(51) Int. Cl.
    *G01S 7/497*     (2006.01)
    *G01S 5/16*     (2006.01)
    *G01S 17/48*     (2006.01)

(56) References Cited

U.S. PATENT DOCUMENTS

| | | | |
|---|---|---|---|
| 7,698,094 | B2 | 4/2010 | Aratani et al. |
| 8,786,700 | B2 | 7/2014 | Kobayashi et al. |
| 9,007,445 | B2 | 4/2015 | Oikawa et al. |
| 2004/0136012 | A1* | 7/2004 | Kyle ................ G01S 5/163 356/614 |
| 2009/0066929 | A1* | 3/2009 | Tropf ................ G01B 11/2513 356/3.12 |
| 2010/0134617 | A1* | 6/2010 | Guertler ................ G01C 15/00 348/135 |

FOREIGN PATENT DOCUMENTS

| | | |
|---|---|---|
| EP | 1 420 264 A1 | 5/2004 |
| JP | 2004-170412 A | 6/2004 |
| JP | 2008-116373 A | 5/2008 |
| JP | 2010-092436 A | 4/2010 |
| WO | 9207233 A1 | 4/1992 |
| WO | 2005/010817 A1 | 2/2005 |
| WO | 2007/079600 A1 | 7/2007 |
| WO | 2010/148525 A1 | 12/2010 |
| WO | 2010/148526 A1 | 12/2010 |
| WO | 2012/110635 A1 | 8/2012 |

\* cited by examiner

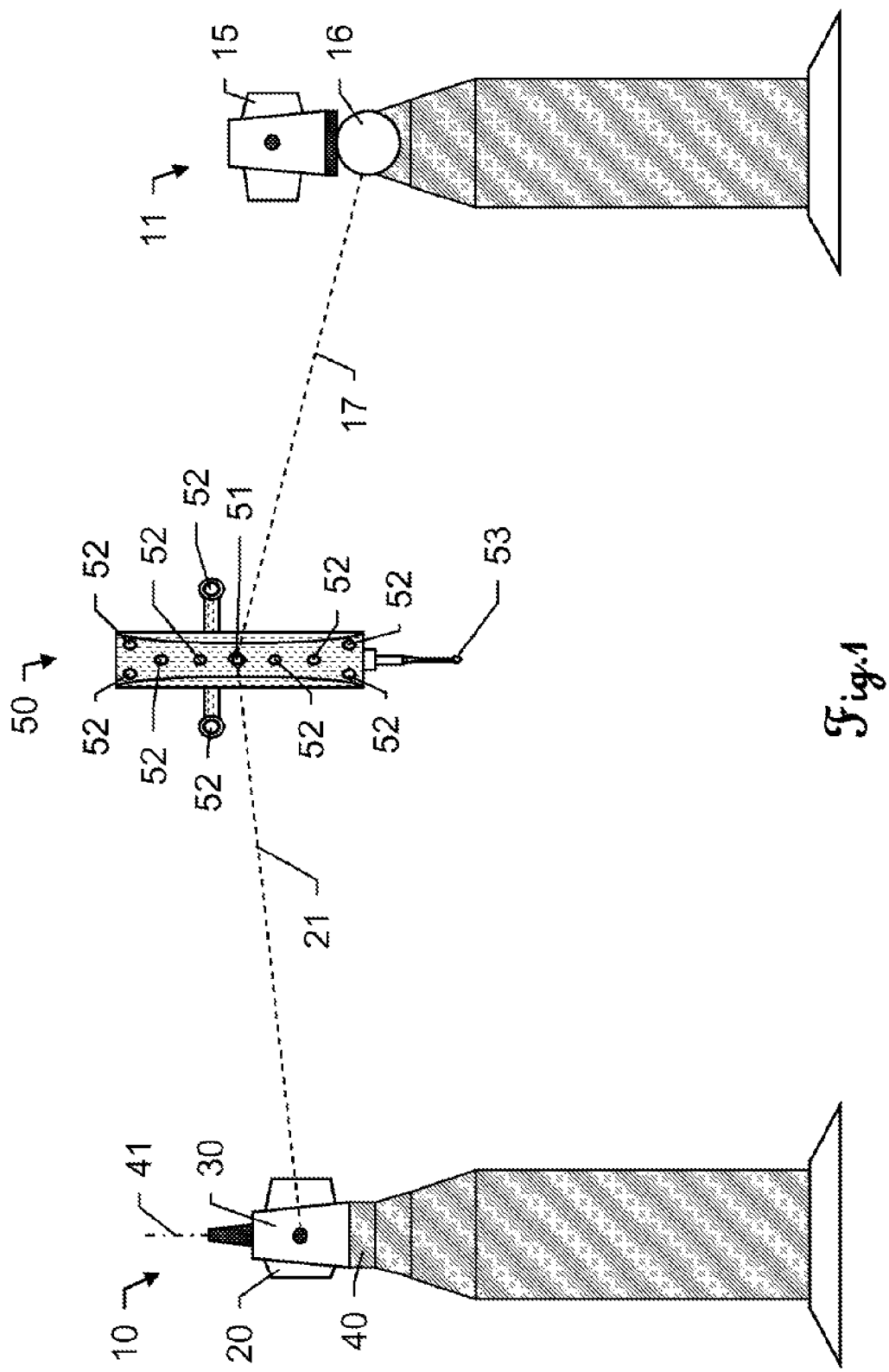

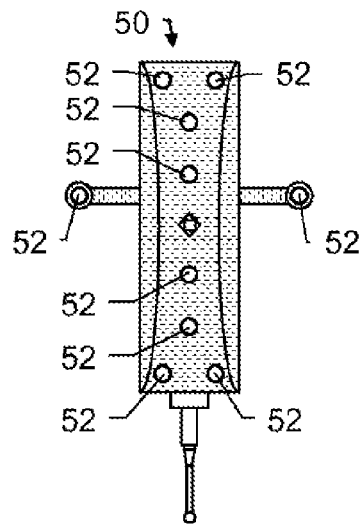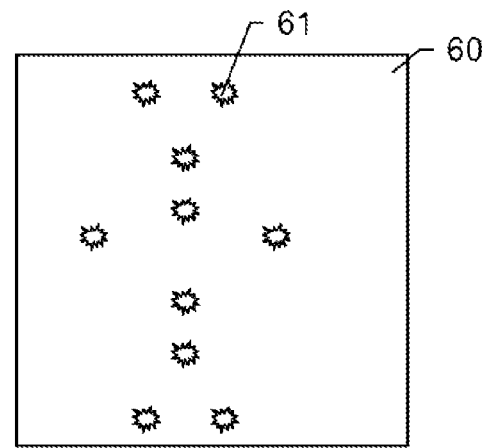
Fig.2a    Fig.2b
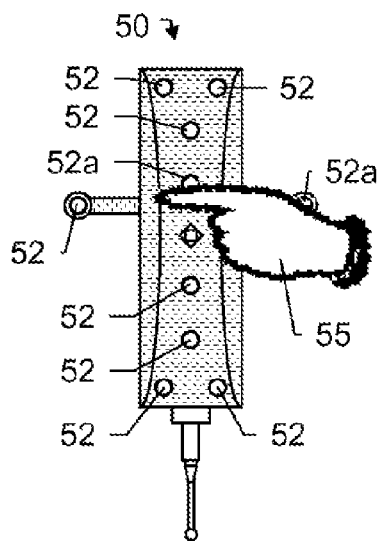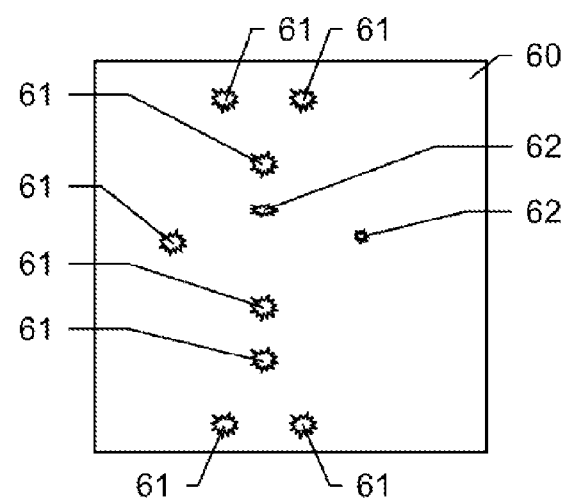
Fig.3a    Fig.3b

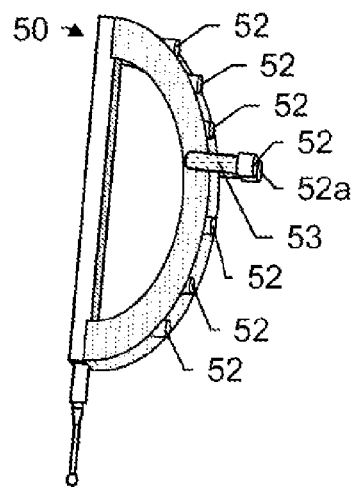
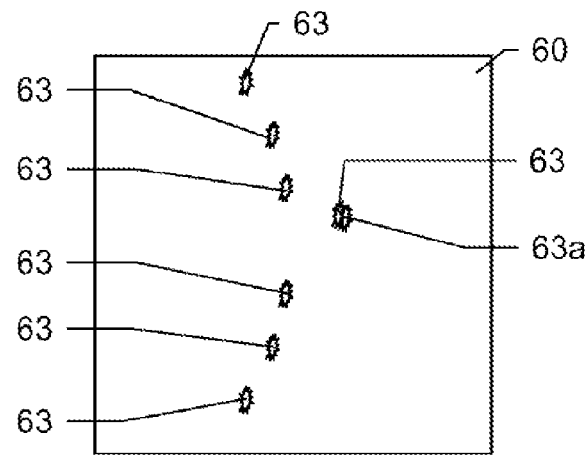
Fig.5a  Fig.5b
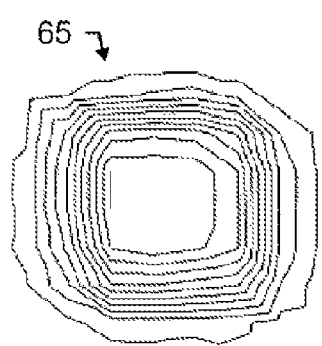
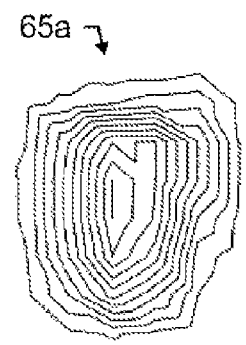
Fig.6a  Fig.6b

METHOD AND DEVICE FOR DETERMINING AN ORIENTATION OF AN OBJECT

FIELD OF THE INVENTION

The invention relates to a method for determining an orientation of an object for and using a laser tracker, a laser tracker having a corresponding functionality, and a computer program product.

BACKGROUND

Measuring devices, which are implemented for progressive tracking of a target point and a coordinative position determination of this point, can generally, in particular in conjunction with industrial surveying, be summarized under the term laser trackers. A target point can be represented in this case by a retroreflective unit (for example, a cube prism), which is targeted using an optical measurement beam of the measuring device, in particular a laser beam. The laser beam is reflected in parallel back to the measuring device, wherein the reflected beam is captured using a capture unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the capture of the beam, for example, by means of runtime or phase difference measurement or by means of the Fizeau principle.

In addition, in modern tracker systems, a deviation of the received measurement laser beam from a so-called servo-monitoring point is ascertained on a sensor—increasingly as a standard feature. By means of this measurable deviation, a position difference between the center of a retroreflector and the point of incidence of the laser beam on the reflector can be determined and the alignment of the laser beam can be corrected or tracked as a function of this deviation such that the deviation on the sensor is decreased, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the tracker system. The tracking can be implemented in this case by means of an alignment change of the deflection mirror, which is movable by a motor, provided for deflecting the laser beam and/or by a pivot of the targeting unit, which has the beam-guiding laser optic.

The described target tracking must be preceded by locking of the laser beam on the reflector. For this purpose, a capture unit having a position-sensitive sensor and having a comparatively large field of vision can additionally be arranged on the tracker. In addition, in devices of the type in question, additional illumination means are integrated, using which the target or the reflector is illuminated, in particular using a defined wavelength differing from the wavelength of the distance measuring means. The sensor can be implemented in this context to be sensitive to a range around this specific wavelength, for example, to reduce or entirely prevent external light influences. By means of the illumination means, the target can be illuminated and, using the camera, an image of the target having illuminated reflector can be captured. By way of the depiction of the specific (wavelength-specific) reflection on the sensor, the reflection position in the image can be resolved and therefore an angle in relation to the capture direction of the camera and a direction to the target or reflector can be determined. An embodiment of a laser tracker having such a target search unit is known, for example, from WO 2010/148525 A1. In dependence on the direction information thus derivable, the alignment of the measurement laser beam can be changed such that a distance between the laser beam and the reflector, onto which the laser beam is to be locked, is decreased.

Laser trackers of the prior art have at least one distance meter for distance measurement, wherein it can be implemented as an interferometer, for example. Since such distance measuring units can only measure relative distance changes, so-called absolute distance meters are installed in addition to interferometers in current laser trackers. For example, such a combination of measuring means for distance determination is known by way of the product AT901 of Leica Geosystems AG. Furthermore, a combination of an absolute distance meter and an interferometer for distance determination using a HeNe laser is known, for example, from WO 2007/079600 A1.

Laser trackers according to the prior art can additionally be embodied having an optical image capture unit having a two-dimensional, light-sensitive array, for example, a CCD or CID camera or a camera based on a CMOS array, or having a pixel array sensor and having an image processing unit. The laser tracker and the camera can be installed one on top of another in this case, in particular in such a manner that the positions thereof in relation to one another are not variable. The camera is, for example, rotatable together with the laser tracker about its essentially perpendicular axis, but is pivotable up-and-down independently of the laser tracker and is therefore arranged separately from the optic of the laser beam in particular. Furthermore, the camera—for example, in dependence on the respective application—can be embodied as pivotable about only one axis. In alternative embodiments, the camera can be installed in an integrated construction together with the laser optic in a shared housing.

With the capture and analysis of an image—by means of image capture and image processing unit—of a so-called measuring aid instrument or measuring aid object having markings, the relative locations of which to one another are known, an orientation of the instrument and of an object (for example, a probe), which is arranged on the measuring aid instrument, in space can be concluded. Together with the determined spatial position of the target point, furthermore the position and orientation of the object in space can be precisely determined absolutely and/or in relation to the laser tracker (6DoF determination: determination of six degrees of freedom).

Such measuring aid instruments can be embodied by so-called scanning tools, which are positioned having the contact point thereof on a point of the target object. The scanning tool has markings, for example, light-emitting diodes (LEDs), and a reflector, which represents a target point on the scanning tool and can be targeted using the laser beam of the tracker, wherein the positions of the markings and the reflector in relation to the contact point of the scanning tool are precisely known. The measuring aid object can also be, in a way known to a person skilled in the art, a handheld scanner equipped for distance measurement, for example, for contactless surface surveying, wherein the direction and position of the scanner measurement beam used for the distance measurement are precisely known in relation to the light-emitting diodes and reflectors which are arranged on the scanner. Such a scanner is described, for example, in EP 0 553 266.

An image having the captured and well (i.e., in particular completely) imaged light-emitting diodes and preferably a known arrangement of the light-emitting diodes on the object is used for a reliable determination of the spatial orientation (6DoF measurement) of the measuring aid object. The orientation of the measuring aid object in space can be derived therefrom by means of image analysis.

In such a 6DoF measurement, a spatial resection is calculated with the aid of the known geometry and with knowledge of the internal orientation of the camera and the orientation of the measuring aid object is determined therefrom. The result of the spatial resection becomes less precise, however (i.e., random measurement uncertainty increases), if individual LEDs are at least partially not visible to the camera.

A particularly unfavorable case occurs if one or more of the LEDs are partially concealed, so that a calculated image coordinate in the captured image is systematically corrupted for a light spot of a respective LED. As a consequence, with the corruption of individual image coordinates, the result of the resection and therefore the determination of the spatial orientation of the measuring aid object are systematically corrupted.

SUMMARY

Some embodiments of the present invention provide an improved method and an improved device for reducing or preventing the above-mentioned measurement errors.

Some embodiments of the present invention provide an improved laser tracker for more reliable orientation determination of an object by means of analysis of light spots captured in an image for the object, wherein a measurement error, which occurs in the event of at least partially concealed light spots, is reduced or prevented.

The invention relates to a method for determining a spatial orientation of a measuring aid object, which has reference features, which are attached in a defined spatial relationship and provide light spots, for and using a laser tracker. The laser tracker has a base, which defines a standing axis, a support, which is pivotable by a motor about the standing axis in relation to the base, a pivot unit, which is rotatable by a motor about a tilt axis in relation to the support, having an image capture unit for capturing an image of the light spots, and a radiation source for emitting a laser beam. In addition, a distance measuring unit for measuring the distance to the measuring aid object by means of the laser beam and an angle measuring functionality for determining an emission direction of the laser beam in relation to the base are provided.

In the scope of the method according to the invention, an image is captured in the direction of the measuring aid object having light spots, which can each be captured in dependence on at least one position and/or on an alignment of the measuring aid object, and the spatial orientation of the measuring aid object is derived by means of image analysis from image positions in the image for the light spots captured in the image.

According to the invention, a local consideration criterion with respect to an appearance of an individual light spot in the image is defined for the image analysis or a global consideration criterion with respect to a position relationship between a number of light spots in the image is defined for the image analysis. In addition, a check of a fulfillment of the local or global consideration criterion is performed for at least one of the light spots captured in the image (in particular by a comparison of an item of image information present in the captured image for the at least one of the captured light spots to the local or global consideration criterion). If the (local or global) consideration criterion is not fulfilled, the at least one of the light spots captured in the image is weighted in reduced form, in particular excluded, for the derivation of the spatial orientation.

I.e., it is checked whether the properties present in the image for one or more light spots correspond to setpoint properties for one or more light spots and, based on this check, a consideration or reduced weighting, especially non-consideration, of the light spot is concluded for the orientation determination.

The reference features can be implemented in particular as light-emitting diodes (LEDs) for emitting light in a specific wavelength range, in particular for emitting infrared light.

Corresponding to a specific embodiment according to the invention of the method, the local consideration criterion defines at least one image attribute for the appearance of at least the one of the light spots in the image, in particular defines a setpoint shape and/or setpoint spatial extension and/or a setpoint brightness distribution and/or a setpoint total intensity and/or a setpoint contrast as the image reference.

In this context, according to a typical embodiment according to the invention, the checking of the fulfillment of the local consideration criterion is carried out based on an individual observation of (individual) LED depictions (or depictions of the reference features) in the image. No knowledge of a relative spatial arrangement of the LEDs on the measuring aid object is necessary for this purpose.

For identification of a partially covered LED, in this case the deviation of the depiction from a reference or standard (=consideration criterion) is used. Either ideal depictions obtained from an optics calculation or experiential values for provided reference features can be used as the reference or standard.

The method according to this embodiment is applicable independently of the total number of the imaged LEDs in the image and is therefore applicable for a single LED. In addition, no knowledge about the orientation of the camera is required.

In particular, in this context the ideal depictions can be stored for possible distances between measuring aid object (for example, measuring feeler) and camera, and also for conceivable orientations of measuring aid object in relation to the camera, wherein these ideal depictions can represent in particular "experiential values" ascertained from real observations.

Especially, the depiction of an LED in the image is characterized in this case by the image attributes, for example, number of the pixels, maximum brightness (brightest pixel), total intensity (total of all grayscale values), shape and/or outline (for example, based on the shape of the active area of an LED or the contour of a passive target mark and optics calculation), brightness distribution within the image (monochromatic or spectral), and/or image sharpness. If one or more of the attributes deviates from the reference values or standard values, this can be recognized and can be an indicator of the partial concealment of the respective LED.

In particular, with respect to the evaluation of the brightness distribution for a light spot of an LED in the image, the image coordinate for this depiction of the LED can be calculated repeatedly, wherein individual parameters are changed and the deviations within the group of image coordinates thus resulting are used as the criterion for a deviation from the expected brightness distribution.

The parameters variable for this purpose are, for example, a brightness threshold (threshold), a dark frame subtraction (offset), a method for focus calculation (for example, binary, linear, or square focal point), an exposure time, and/or a focus calculation according to individual pixel colors separated from one another.

With respect to the definition or establishment of the global or local consideration criterion, this consideration criterion—alternatively or additionally to the provision of the criterion in a database of the laser tracker—can be derived according to the invention in particular from the captured image, in particular from respective graphic depictions of the light spots in the image, in particular from a comparison of the respective graphic depictions of the light spots.

In this context, a further embodiment according to the invention, of the check as to whether a reference feature was provided partially concealed during the image capture, is concerned with a comparison of the depictions of all reference features captured in the image (=light spots in the image). In this case, the depiction of an individual reference feature in the captured image is compared to the depictions, which also result in the same recording, of the reference features which are also captured in the image. This can be performed in particular in the case of reference values for the reference feature which cannot be considered (for example, because of variation breadth as a result of manufacturing tolerances, movement fuzziness, interference due to atmosphere, etc.) or are not stored. The greater the number of the depicted reference features is in this case and the fewer thereof are partially concealed, the more reliably is this method applicable. Furthermore, it is a requirement for this purpose that the captured reference features are implemented essentially similarly or have a similar reflection property (for passive reference features such as retroreflective films) or have similar light emission (for active reference features such as light-emitting diodes).

This method is especially based on the same principle as the above-described method. The same image attributes and calculation methods can be used. The difference is primarily in that no absolute reference values or standard values for the depiction of an LED in the image exist, but rather all depictions of LEDs arising in the same recording are compared to one another.

To reduce the computing effort, the light spots of the LEDs in the image can firstly be sorted according to one or more selected image attributes, for example, according to the number of the pixels, and only, for example, a first and/or a second light spot on a list thus generated can be checked for a possible partial coverage.

Furthermore, the global consideration criterion, according to a further embodiment according to the invention, can define a relative spatial setpoint positioning of the image positions in the image for the number of the light spots captured in the image, in particular in consideration of a respective orientation of the measuring aid object.

A further aspect of the invention with respect to checking the fulfillment of the global or local consideration criterion relates to a chronologically offset capture of at least one further image having the light spots, in particular progressively of (multiple) further images. The check of the fulfillment of the local or global consideration criterion is performed for at least the one light spot captured in the images in this case by a comparison of the images, in particular is performed by a comparison of the appearance of the individual light spot in the images or by a comparison of the respective image position for the individual light spot in the images. Therefore, the state of the light spot can thus be monitored or tracked and, for example, an occurring concealment of the spot can be recognized therefrom.

In other words, this means that a chronological sequence (i.e., a series) of images is captured (wherein the images essentially each have the same reference features depicted in the images as light spots) and, for example, a shared light spot in the captured images is compared and its chronological development is determined. From this observation, a change of the light spot in the images can then be concluded and, based thereon, for example, an occurring (partial) concealment of the light spot can be recognized. On the one hand, this can be recognized by a change of the appearance (for example, the shape or brightness) of the corresponding light spot or by a change of the image position for the light spot.

In this context, a single image or an image sequence (in the scope of which, for example, the relevant light spot is captured unchanged) can therefore be used for the definition of the consideration criterion and a subsequent image (or a light spot of the image) can be evaluated based on this defined consideration criterion.

In addition, according to a further specific embodiment of the invention, for the check of the fulfillment of the local consideration criterion, an item of graphic information can be derived from the image for the at least one of the light spots captured in the image, in particular an actual shape and/or actual spatial extension and/or an actual brightness distribution and/or an actual total intensity and/or an actual contrast which is captured for the light spot in the image. Alternatively or additionally—also according to the invention—for the check of the fulfillment of the global consideration criterion, an image position, which is determined by means of image processing, for the at least one of the light spots in the image, which are captured in the image, can be used, in particular wherein the image position is determined by means of focus calculation in the image based on a brightness distribution.

In particular, in the scope of the method according to the invention, during the check of the fulfillment of the local or global consideration criterion, a spatial structure of the measuring aid object and/or a measurement space and also in particular a position of the measuring aid object can be considered, in particular wherein a position and dimensioning of a visual obstruction are considered.

During the check according to the invention of the LEDs depicted in the image, i.e., during the check of the light spots generated by the LEDs in the image, therefore, according to a special embodiment, known spatial structures, for example, of the measuring aid object or the measurement space, can be taken into consideration during the identification of partially covered LEDs.

For this purpose, in addition to the relative spatial arrangement of the LEDs, a shape and spatial location of structures in the measurement volume, which can result in a partial coverage of at least one LED, are also known, whereby it can be calculated when an LED could possibly no longer be completely depicted on the image sensor and it is preventively excluded from the calculation of the resection.

Such structures, which can frequently result in the partial coverage, include, for example, the housing of the measuring aid object itself, parts of devices and tools, buildings, and/or safety units (and/or also people), wherein the 6DoF measurement (position and orientation of the measuring aid object) additionally provides the present relative spatial location thereof in relation to the camera at any time.

If an LED is located in the vicinity, i.e., within a predefined distance to a known structure, the depiction of this LED can be preventively excluded from the calculation of the resection, even if there is possibly still no coverage. In addition, in the case of recurrent measurement sequences, for example, in automation, spatial regions, within which an LED could be partially covered, can be ascertained in a test run and taken into consideration for a corresponding measurement.

According to the invention, in particular from the or by way of the check of the fulfillment of the local or global consideration criterion, at least partial concealment can be determined for at least the one of the light spots captured in the image, wherein if partial concealment of the light spot is present, this light spot is weighted in reduced form for the derivation of the spatial orientation.

Furthermore, according to a further specific embodiment, for the check of the fulfillment of the local or global consideration criterion, a comparison quality value, which specifies a degree of correspondence of consideration criterion and an item of image information, can be ascertained—by comparing the consideration criterion and the item of image information—and a confidence range can be defined for the comparison quality value, wherein the item of image information for at least the first light spot is derived from the captured image.

If a presently determined comparison quality value in the scope of the check of the fulfillment of the local or global consideration criterion for the at least one of the captured light spots is provided within the confidence range, a consideration can especially be performed, and if the determined comparison quality value is present outside the confidence range, a reduced weighting of the light spot can be performed for the derivation of the spatial orientation.

In addition, according to the invention, in particular during the or in the scope of the check of the fulfillment of the local or global consideration criterion for each of the light spots captured in the image, an individual residual can be determined (the respective residuals are thus in particular determined by the check of the fulfillment of the local or global consideration criterion) and it can be checked whether the respective residuals lie within a settable expectation range, wherein if one or more residuals are present outside the expectation range, the corresponding light spot or spots are weighted in reduced form for the ascertainment of the comparison quality value, in particular are excluded for the derivation of the spatial orientation.

According to a special embodiment of the method according to the invention, additional auxiliary markings can be arranged in relation to measurement reference features on the measuring aid object for executing the method. By way of a skillful arrangement of these additional auxiliary markings, which are not absolutely necessary for the actual measurement (and which—like the measurement reference features—can also be implemented as LEDs or as retroreflective), around the actual measurement features, it can be captured whether, for example, a measurement LED could possibly no longer be completely depicted in the image.

A measurement reference feature forms a composite or a group (cluster) with the auxiliary markings. If this group is no longer completely depicted on the image sensor, i.e., if one or more of the additional auxiliary markings is absent, the risk exists that the central measurement reference feature is no longer completely depicted. For this case, the respective measurement reference feature can be preventively excluded from the further calculation of a resection.

Since the additional auxiliary markings are essentially used for the capture of a possible partial concealment of the central measurement reference features and otherwise are not incorporated in the further calculation, they have no influence on the quality of the measurement result. The requirements for these auxiliary markings are therefore correspondingly less in comparison to the measurement reference features (brightness, size, homogeneity of the illumination, etc.), which also enables the application of the method in particular in the case of LED-based measurement systems.

A suitable shape for the additional auxiliary marking is a ring around the actual measurement reference feature, for example, made of retroreflective film or of LEDs located adjacent to one another. A further suitable alternative is the arrangement of multiple separate markings, which are also depicted separately on the image sensor. In this case, it must only be counted for the capture, for example, whether all auxiliary markings appear in a predefined region around the measurement reference features on the image sensor.

As an alternative or additional embodiment according to the invention, further calculations of the resection (orientation determination of the measuring aid object) can be carried out, in that in each case specific LEDs or light spots in the image are not taken into consideration and it is recognized in this case whether a relevant quality index (for example, a standard deviation for the image coordinates) improves significantly and thus, for example, lies in a predefined expectation range. By means of this quality index it is recognizable whether a light spot for an LED has a significant (error-causing) influence on the measurement result. Such an embodiment is to be assigned in particular to the check of the global consideration criterion, wherein a relative standard deviation or a relative difference of the quality index or a relative difference of individual (or multiple) standard deviations is defined as the criterion, for example.

In this case, for example, individual ones of the captured light spots can be successively excluded in the calculation and the quality index can be determined for each calculation, in that in each calculation a "best fit" with a known distribution of the light spots on the measuring aid object is performed and in this case a standard deviation is determined in each case or in that in the orientation of the measuring aid object is determined with orientation angles and, for example, for each angle calculation, a respective standard deviation is determined. By way of a comparison of the standard deviations, those light spots can be identified therefrom, which are not correctly depicted in the image. In particular, in this case the light spot can be identified as incorrect, which was excluded in the calculation having the smallest total standard deviation or having the greatest improvement of the standard deviation. In particular, if a standard deviation is determined in the case of each "omission" of a light spot (in the scope of the "best fit" method) for each spot which is still fitted, thus, for example, the light spot can be identified as "bad", which was excluded in the calculation having the smallest total standard deviation or having the greatest improvement of the standard deviation.

Depending on the number of the LEDs, the available calculation time, the computing power, and/or the requirements for the real-time output of the measurement results, the light spots of the LEDs can be sorted with respect to a probability of a partial coverage or classified and processed, for example, beginning with the smallest total intensity.

The invention additionally relates to a laser tracker for the position and/or alignment determination of a measuring aid object, which has reference features, which are attached in a defined spatial relationship and provide light spots, and in particular for the progressive tracking of the measuring aid object. The tracker has a base, which defines a standing axis, a support, which is pivotable by a motor about the standing axis in relation to the base, a pivot unit, which is rotatable by a motor about a tilt axis in relation to the support, having an image capture unit for capturing an image of the light spots, and a radiation source for emitting a laser beam. In addition, a distance measuring unit for measuring the distance to the measuring aid object by means of the laser beam, an angle measuring functionality for determining an emission direction of the laser beam in relation to the base, and a control and processing unit having a functionality for determining a spatial orientation of the measuring aid object are provided. Upon execution of the functionality, the spatial orientation of the measuring aid object is derived by means of image analysis from image positions in the image for light spots captured in the image, wherein, controlled by the control and processing unit, the image is captured in the direction of the measuring aid object with light spots which can each be captured in dependence on at least one position and/or on an alignment of the measuring aid object.

According to the invention, a local consideration criterion with respect to an appearance of an individual light spot in the image is defined for the image analysis or a global consideration criterion with respect to a position relationship between a number of light spots in the image is defined for the image analysis. In addition, the control and processing unit has a checking functionality, upon the execution of which, for at least one of the light spots captured in the image, a check of a fulfillment of the consideration criterion is performed (in particular by way of the comparison of an item of image information provided by the captured image for the at least one of the captured light spots to the consideration criterion). If the consideration criterion is not fulfilled, the at least one of the light spots captured in the image is weighted in reduced form, in particular excluded, during execution of the functionality for the derivation of the spatial orientation.

The control and processing unit of the laser tracker can be implemented according to the invention in particular to execute an above-described method according to the invention.

With respect to the embodiment of the measuring aid object, according to the invention, additional auxiliary markings can be arranged on the measuring aid object, which are positioned in a defined spatial relationship in relation to one of the reference features, wherein upon execution of the checking functionality, depictions of the auxiliary markings in a captured image are checked with respect to the fulfillment of the local or global consideration criterion.

The reference features of the measuring aid object are in particular implemented as self-lighting means, which provide the light spots, in particular as light-emitting diodes.

A further aspect of the invention relates to a computer program product for controlling the image capture in the direction of the measuring aid object and for executing the determination of the spatial orientation of the measuring aid object and the check of the fulfillment of the consideration criterion according to a method according to the invention, wherein the computer program product is stored on a machine-readable carrier, in particular when the computer program product is executed on a control and processing unit of a laser tracker according to the invention.

BRIEF DESCRIPTION OF THE DRAWINGS

The method according to the invention and the device according to the invention will be described in greater detail hereafter solely as an example on the basis of specific exemplary embodiments, which are schematically illustrated in the drawings, wherein further advantages of the invention will also be discussed. In the specific figures:

FIG. 1 shows two embodiments of laser trackers according to the invention;

FIGS. 2a-b show a measuring aid object and a captured image having light spots, which are provided by LEDs on the measuring aid object;

FIGS. 3a-c show a measuring aid object, a captured image having light spots, which are provided by the LEDs on the measuring aid object, and an image having ascertained image positions for the light spots;

FIGS. 5a-b show a measuring aid object in a lateral alignment in relation to a camera and a captured image corresponding to this laterally aligned measuring aid object;

FIGS. 6a-b each show a contour plot for a brightness distribution of the depiction of a square LED—unconcealed and partially concealed;

DETAILED DESCRIPTION

Figure 3C:
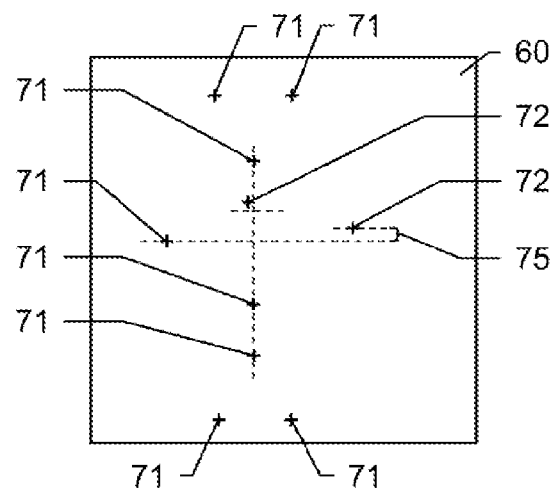

FIG. 1 shows two embodiments of laser trackers 10, 11 according to the invention and a measuring aid object 50, the position and orientation of which (6DoF=with six degrees of freedom, three translational and three rotational) are to be determined and which is optionally to be tracked using a respective measurement laser beam 17, 21. The measuring aid object 50 is implemented here as a tactile measuring device. The first laser tracker 10 has a base 40 and a support 30, wherein the support 30 is arranged so it is pivotable or rotatable in relation to the base 40 about a pivot axis 41 defined by the base 40. In addition, a targeting unit 20 (pivot unit) is arranged on the support 30 such that the targeting unit 20 is rotatable in relation to the support 30 about a tilt axis (inclination axis or transit axis). By way of an alignment capability of the targeting unit 20 about two axes which is thus provided, a laser beam 21 emitted by this unit 20 can be exactly aligned and therefore targets can be targeted. This alignment can be performed automatically by means of a motorization. The pivot axis 41 and the inclination axis are arranged essentially orthogonally to one another in this case, i.e., slight deviations from exact axis orthogonality can be predetermined and stored in the system, for example, to compensate for measurement errors thus resulting.

In the arrangement shown, the measurement laser beam 21 is oriented on a reflector 51 (retroreflector) on the measuring aid object 50 and is retroreflected thereon back to the laser tracker 10. By means of this measurement laser beam 21, a distance to the object 50 or to the reflector 51 can be determined, in particular by means of runtime measurement, by means of the phase measurement principle, or by means of the Fizeau principle. The laser tracker 10 has for this purpose a distance measuring unit (having interferometer and absolute distance meter) and has angle meters, which make it possible to determine a position of the targeting unit 20, by means of which the laser beam 21 can be aligned and guided in a defined manner, and therefore a propagation direction of the laser beam 21.

In addition, the laser tracker 10, in particular the pivot unit 20, has an image capture unit. This image capture unit can have a CMOS for the purpose of a position determination of a sensor illumination on a sensor or in a captured image, or is implemented in particular as a CCD or pixel sensor array camera. Such sensors enable a position-sensitive detection of captured illumination on the detector. Furthermore, the measuring aid object 50 has a tactile sensor, the contact point 53 of which can be brought into contact with a target object to be measured. While this contact exists between the scanning tool 50 and the target object, a position of the contact point 53 in space and therefore the coordinates of a point on the target object can be exactly determined. This determination is performed by means of a defined relative positioning of the contact point 53 in relation to the reflector 51 and in relation to reference features 52 arranged on the measuring aid object 50, which can be implemented, for example, as light-emitting diodes 52 (LEDs). Alternatively, the reference features 52 can also be implemented such that, in the event of illumination, for example, with radiation of a defined wavelength, they reflect the incident radiation (for example, retroreflective markings 52), in particular display a specific illumination characteristic, or that they have a defined pattern or color coding. Therefore, an orientation of the scanning tool 50 can be determined from the location or distribution of the light spots generated by the reference features 52 in an image captured using a sensor of the image capture unit.

Therefore, the captured image of the measuring aid object 50 or of the provided light spots of the object 50 is used as the foundation for the determination of the orientation. For a focused capture of the LEDs 52 having an optimum and known image scale in particular, the laser tracker 10 has a vario-zoom lens, i.e., two optical assemblies (for example, lenses) which can be positioned independently of one another in relation to the image capture sensor.

For this determination, the laser tracker 10 has an orientation determination functionality, which is executable by a control and processing unit of the tracker 10. In the scope of this embodiment, an image of the reference features 52 of the measuring aid instrument 50 is captured and, based on image positions for the light spots captured in the image, the orientation or alignment of the measuring aid object 50 is derived by means of image processing. In this case, the camera is aligned such that an image can be captured in the direction of the object 50 targeted by means of the laser beam 21. Furthermore, during the image capture, in each case only those light sources 52 can be captured which can be "seen" by the camera, in dependence on the alignment of the measuring aid object 50 and/or in dependence on visual obstructions. In this case, for example, one or more light-emitting diodes 52 can be partially concealed and therefore cannot be depicted completely and in accordance with defined specifications (consideration criteria) in the image.

For a check according to the invention of the light spots captured in the image with respect to fulfillment of a consideration criterion, which specifies under which conditions a depicted light spot 52 is considered for the determination of the orientation or is not considered or considered in reduced form, the image information provided by the capture of one or more light spots 52 (for example, brightness distribution in the image for a light spot or relative location in the image of the light spots depicted in the image) is compared to the criterion. If the criterion is not fulfilled, the respective checked light spot or the corresponding LED 52 (or multiple LEDs) are not used or are used with reduced relevance for the determination of the spatial orientation of the measuring aid object 50.

By way of such a check, incorrectly represented light spots 52 can reliably be excluded during the orientation determination and thus a more precise and robust 6DoF determination can be performed for the measuring aid object 50 upon execution of a measurement.

For example, in this case a brightness distribution of an individual light spot in the image can be compared to a reference brightness distribution for such a spot and if a previously defined degree of correspondence of the checked light spot is present, it cannot be excluded during the orientation determination.

In addition, for example, a previously known relative location of the reference features 52 (for example, LEDs or retroreflective film) on the measuring aid object 50 can be used for the comparison. On the basis of this known relative location of the reference features 52, the respective positions of the light spots in the image, which are thus provided and captured, can then be compared for the correspondence thereof to setpoint positions in the image defined by the known location and checked with respect to the fulfillment of the consideration criterion (=do the positions of the light spots in the image captured in the image correspond to setpoint positions, which are given by the known arrangement of the LEDs 52 on the measuring object 50—for example, within a predefined tolerance range?). If the consideration criterion is not fulfilled, the light spot or light spots, for which the non-fulfillment was established, are taken into consideration in reduced form, in particular are not taken into consideration, for the orientation determination.

By way of such an above comparison of consideration criterion and image information, a partial concealment of one or more reference features 52 during the image capture and an erroneous depiction of the light spots thus caused can be concluded. If the brightness distribution for a light spot is not provided in this context, for example, such that it corresponds to a setpoint brightness distribution, this is a direct indication of a partial concealment of the LED 52, which generates the respective light spot. With respect to the position comparison, non-correspondence to the criterion (for example, setpoint positions for the depicted light spots in the image) occurs in particular when the respective point is partially concealed during the capture and thus, for example, a deviating image position is calculated from a focus calculation for the spot.

The check according to the invention can be executed automatically, for example, during a capture of an image or as needed (i.e., for example, manually upon a user input). In addition, individual spots captured in the image can be selected in the image and checked.

The second laser tracker 11 has a beam guiding unit 16, which is separate from a pivot unit 15 (vario-camera), for emitting a second laser beam 17, which is also aligned on the reflector 51. Both the laser beam 17 and also the pivot unit 15 are each pivotable by a motor about two axes and can thus be aligned such that by means of the vario-camera 15, the target 51, which is targeted using the laser beam 17, and the LEDs 52 of the measuring aid object 50 can be captured. Therefore, a precise distance to the reflector 51 and an orientation of the object 50 can also be determined here on the basis of the spatial location of the LEDs 52.

For the respective alignment of the laser beams 17, 21 on the reflector 51, illumination means are provided on each of the laser trackers 10, 11 for illuminating the reflector 51 with radiation of a specific wavelength, in particular in the infrared wavelength range, and in addition at least one target search camera having a position-sensitive detector, a so-called ATR (automatic target recognition) camera, is arranged on each tracker 10, 11. The illumination radiation, which is reflected on the reflector 51 and radiated back to the laser tracker 10, 11, can be captured in each case by means of the camera and a position of the reflector 51 on the respective detector can be depicted using the position-sensitive detectors. Therefore, both using the first laser tracker 10 and also using the second laser tracker 11, a depicted position of the reflector can be determined and, in dependence on these detected search image positions, the target (reflector 51) can be found in the image and the targeting unit 20 (pivot unit) or the beam guiding unit 16 can be aligned such that the target is automatically targeted using the measurement beam 17, 21 or the laser beam 17, 21 automatically (iteratively) approaches the target 51. The laser trackers 10, 11 can alternatively each have at least two cameras, each having a position-sensitive detector, wherein in each case a coarse position of the reflector 51 can be determined, for example, for each tracker 10, 11 from the two captured search image positions for the reflector 51 in each case.

The distance measuring unit of the respective laser tracker 10, 11 provides an item of distance information to the target 51 on the basis of a determination of a relative or absolute distance between the respective tracker 10, 11 and the target 51 and a determination of a change of this distance. If the absolute distance is determined in this case in particular by means of runtime measurement, by means of the phase measurement principle, or by means of the Fizeau principle, a measurement using an interferometer associated with the respective distance measuring unit is thus carried out to determine the distance change. The measurement radiation 17, 21 is emitted from the tracker 10, 11 such that it is incident on the target 51 and is reflected back thereon. The reflected beam or parts of the reflected beam are then again captured on the part of the tracker 10, 11 and guided along a measurement path to the interferometer detector, where the reference radiation is superimposed with the received measurement radiation 17, 21. Due to this superposition, an interference results from the two radiations, which can be captured on the detector and resolved. A distance change can be determined, for example, by capture of maxima (constructive interference) and minima (destructive interference). In this case, the captured intensity maxima and/or intensity minima are counted progressively in particular.

By way of the position determination by means of distance measurement and the alignment provided in this case of the measurement laser beam 17, the three translational degrees of freedom can be determined for the targeted measuring aid object 50. The laser tracker 11 additionally has a functionality for determining the orientation of the measuring aid object 50 (three rotational degrees of freedom), upon the execution of which an image of the measuring aid object 50 having visible reference features 52 in each case is captured and the spatial orientation of the object 50 is derived from image positions for the light spots of the reference features 52 captured in the image. The image position for a light spot is determined for this purpose, for example, from a focus calculation based on a brightness distribution or based on a contrast for the respective light spot.

The determination of the image position for a light spot is dependent in particular on the appearance of the respective light spot captured in the image. If the spot is visible completely and well during the image capture, it is typically captured in the image such that image attributes which can be assigned to the spot in the image, which is captured in the image, are formed such that they correspond to forms for corresponding setpoint attributes or are within an acceptance range for these setpoint attributes, i.e., the reference feature 52 is depicted in the image as a light spot as expected.

However, if the reference feature 52 (LED) is partially concealed during the image capture or if the measuring aid object 50 is located in an alignment in which the emission direction of the LED 52 (which generates the light spot) is at an unfavorable angle in relation to the camera (for example, >90°), this light spot 52 is thus captured in the image with image attributes which are not according to expectations, i.e., for example, the brightness distribution thus captured does not correspond (in the scope of a tolerance range) to a distribution for a corresponding light spot which is captured frontally and completely. Such corrupted image properties for a light spot thus result in a position deviating from a setpoint value in the image from the focus calculation or from the determination of the corresponding image position.

In the case of an orientation determination by means of the provided functionality, also based on such an erroneous image position for at least one spot, an orientation for the measuring aid object 50 would then also be determined with an error.

To reduce or prevent such an erroneous orientation determination, the laser tracker 11 additionally has a checking functionality according to the invention, upon the execution of which (by a control and processing unit of the tracker 11), at least one light spot captured in the image is checked with respect to fulfillment of a consideration criterion. If this criterion is not fulfilled, the at least one checked light spot is taken into consideration weighted in reduced form for the derivation of the orientation of the measuring aid object 50. Therefore, incorrectly depicted reference features 52 or the light spot provided by the respective feature 52 can be filtered and, as a result, an error can be avoided during the orientation determination in particular.

The consideration criterion can specify in this context, for example, a setpoint shape and/or setpoint spatial extension and/or a setpoint brightness distribution and/or a setpoint total intensity (with respect to the light intensity) and/or a setpoint contrast for a light spot 52 as an image reference or can define a relative spatial setpoint positioning of the image positions in the image for the number of the light spots captured in the image.

FIGS. 2a and 2b show a measuring aid object 50 (FIG. 2a) and an image 60, in which light spots 61 are captured (FIG. 2b), which are provided by the LEDs 52 on the measuring aid object 50. A camera unit, using which the image 60 is captured, can in particular have a wavelength-selective filter for essentially exclusively capturing an emission wavelength of the LEDs 52 or an illumination wavelength for reflective reference features. Thus, for example, an influence of scattered radiation can be prevented and the quality of the depiction of the light spots can be improved.

According to the frontal alignment shown here of the measuring aid object 50 in relation to an image-capturing camera, the light spots 61 are optimally depicted in the image 60 and each correspond to a setpoint depiction for such LEDs 52. Upon a check according to the invention of these captured light spots 61, accordingly all depicted light spots 61 would be considered to fulfill the consideration criterion and none of the spots 61 would be identified as not to be considered. Based on these light spots 61 captured in the image 60, an image position can then be determined for each light spot 61—by means of image processing. A spatial orientation of the measuring aid object 50 can be derived from the image positions and from a known relative arrangement of the LEDs 52 on the measuring aid object 50 (and a therefore known relative setpoint positioning of the light spots 61 in the image 60).

FIG. 3a shows a measuring aid object 50 having reference features 52, 52a arranged at defined positions, wherein the reference features 52a are each partially concealed by an obstruction 55 (for example, a hand of a user here).

FIG. 3b shows an image 60 having captured light spots 61, 62 corresponding to the reference features 52, 52a. The light spots 61 each represent in this case a depiction of the completely visible reference features 52. In contrast, the light spots 62 each represent a depiction of the partially concealed reference features 52a in the image 60.

During a determination of the spatial orientation of the measuring aid object 50 based on the light spots 61, 62, an orientation can be determined with a certain error because of the light spots 62, which are not depicted completely and according to expectations. This results from the image position determination for the light spots 62, wherein the brightness distribution for the reference features 52, which are not depicted completely, is used during a focus calculation for determining the image positions.

To reduce the occurrence of such errors, or to prevent them, in the scope of the method according to the invention, the light spots 61, 62 are checked for the fulfillment of a consideration criterion (in particular for consideration of the orientation determination). For this purpose, an item of information provided by the captured image and the light spots 61, 62 captured therein, for example, a brightness distribution for a light spot or a relative spatial relationship of the light spots 61, 62, is compared to the consideration criterion, for example, a setpoint brightness distribution for a light spot (local consideration criterion) or a defined relative spatial setpoint relationship of the light spots 61, 62 or the reference features 52, 52a (global consideration criterion). If the item of information corresponds to the consideration criterion in this case, in particular in the scope of a predefined tolerance range, the respective checked light spot is thus considered for the orientation determination or, if it does not correspond, the light spot is weighted in reduced form, respectively.

According to an embodiment shown in FIG. 3c, it is calculated, based on the known relative spatial arrangement of the LEDs 52, where on the image sensor (or in the image 60) the depictions of the LEDs 52 would have to appear. A deviation 75 from a predicted image coordinate for a light spot 62 can be an indicator of a partial coverage of the corresponding LED 52a. Since the image coordinates 72 for the light spots 62 are changed because of partial concealment of the LEDs 52a, the external spatial orientation is thus systematically corrupted.

In the scope of a check according to the invention, a known outlier test can be applied to residuals of the image coordinates 71, 72 after the calculation of a first resection. The residuals are calculated for all image coordinates 71, 72 with the result of a first calculation using all LED depictions 61, 62. It is subsequently checked whether the greatest residual or residuals is/are still within a random distribution (for example, normal distribution or t distribution).

The confidence range can be defined in this case, for example, according to experience or desired sensitivity. Subsequently, the resection is repeated without any possible identified outliers, i.e., the respective light spot 62 is not considered for the determination of the spatial orientation of the measuring aid object 50.

Figure 4A:
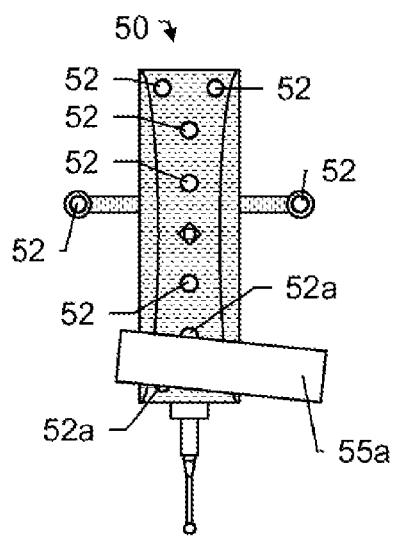
FIGS. 4a-b shows a measuring aid object having a visual obstruction and a captured image having light spots, which are provided or partially concealed, respectively, by the LEDs on the measuring aid object and the visual obstruction.
Figure 4B:
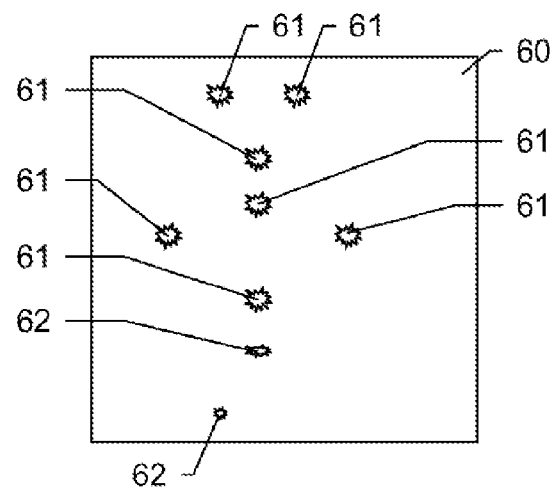

FIG. 4a shows a measuring aid object 50 having reference features 52, 52a arranged at defined positions according to FIG. 3a, wherein here the reference features 52a are each partially concealed by a structural obstruction 55a (for example, a part of a robot arm) and a further reference feature is completely concealed. FIG. 4b shows a corresponding image 60 having captured light spots 61, 62 (for the respective reference features 52, 52a). The light spots 61 each represent a depiction of the completely visible reference features 52 in this case. In contrast, the light spots 62 each represent a depiction of the partially concealed reference features 52a in the image 60. The completely concealed feature of the object 50 is not captured in the image 60. A check according to the invention of the light spots 61, 62 which are captured in the image 60 can be performed similarly to the above-described check with respect to the fulfillment of a consideration criterion.

FIG. 5a shows a measuring aid instrument 50 having LEDs 52, which are arranged in a known spatial relationship, in a lateral alignment in relation to a camera, using which the measuring aid instrument 50 is captured. FIG. 5b shows an image 60 having captured light spots 63 for the LEDs 52 corresponding to the lateral alignment of the instrument 50. In such an alignment, the light spots 63 for the LEDs 52 are depicted in distorted form on the image sensor, so that the individual light spots 63 do not correspond to an expected complete depiction of the respective LED 52. In addition, the LED 52a is partially concealed by the structure 53, whereby the corresponding light spot 63a is depicted in distorted form and additionally incompletely.

However, in the scope of a check according to the invention, a spatial relationship of the light spots 63 captured in the image 60 can be derived from the image 60 and a positive correspondence of this spatial relationship in the image 60 to the known spatial arrangement of the LEDs 52 on the instrument 50 can be established, from which a fulfillment of the consideration criterion can be established. For this purpose, for respective alignments of the measuring aid instrument 50, respective setpoint values for the appearance of the light spots 63 in the captured image are stored in particular in a database of a laser tracker having corresponding functionalities according to the invention.

Furthermore, a structural embodiment 53 of the measuring aid instrument 50, which can impair visibility of individual or multiple LEDs 52—in particular depending on the alignment of the measuring aid instrument 50, and/or a structure of a measurement space, can be stored in the database or the control and processing unit, wherein these structures can be taken into consideration during the check of the fulfillment of the consideration criterion.

FIGS. 6a-b each show a contour plot 65, 65a for a brightness distribution of the depiction of a square LED. FIG. 6a shows the contour plot 65 for the captured LED without a partial concealment of the LED by an obstruction. Such a brightness distribution 65 can, on the one hand, be stored in the system (control and processing unit of a laser tracker) as a reference or as a consideration criterion to be fulfilled, and can be used as a comparison image for depictions of LEDs in the image. On the other hand, a large degree of correspondence and therefore the consideration of the light spot for the determination of an orientation of a measuring aid instrument is to be established for a correspondingly depicted LED upon execution of a check of the fulfillment of a given consideration criterion with respect to the brightness distribution.

FIG. 6b shows a contour plot 65a for the brightness distribution of a depiction of the identical square LED (with respect to FIG. 6a), wherein it is partially concealed from the left. Because of the partial concealment of the LED, this brightness distribution 65a differs in its spatial extension and shape from a distribution for an unconcealed depiction of the LED according to FIG. 6a. Upon execution of the checking functionality according to the invention (wherein the partially concealed light spot which generates this distribution is checked), nonfulfillment of the consideration criterion, which specifies a setpoint brightness distribution for such LEDs, is established for this light spot 65a, and this light spot is therefore not taken into consideration or is only taken into consideration with reduced weighting for the orientation determination.

Figure 7:
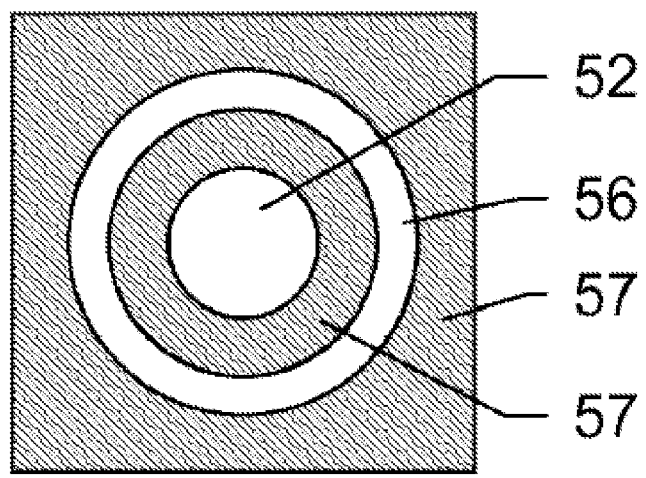
FIG. 7 shows a first embodiment according to the invention of a measurement target mark or a measurement LED having an auxiliary marking for capture of a potential partial coverage of the LED.

FIG. 7 shows a first embodiment according to the invention of a measurement target mark or an LED 52 having an auxiliary marking 56 on a measuring aid object for capture of a potential partial coverage of the LED 52. The auxiliary marking 56 is implemented in this case in a ring shape around the LED, wherein this auxiliary marking 56 can be embodied as a retroreflective film or as an LED and/or a passive retroreflective film can be provided instead of the LED 52. The position of the measurement target mark or the LED 52 is used to calculate a spatial resection to determine the orientation of the measuring aid object. If the ring-shaped auxiliary marking 56 is not depicted as closed on the image sensor, this is an indication that the measurement target mark 52 (or LED) is partially concealed.

To increase the contrast in a captured image having the auxiliary marking 56, a dark mask is provided around the auxiliary marking 56 and between the auxiliary marking 56 and the LED 52.

Figure 8:
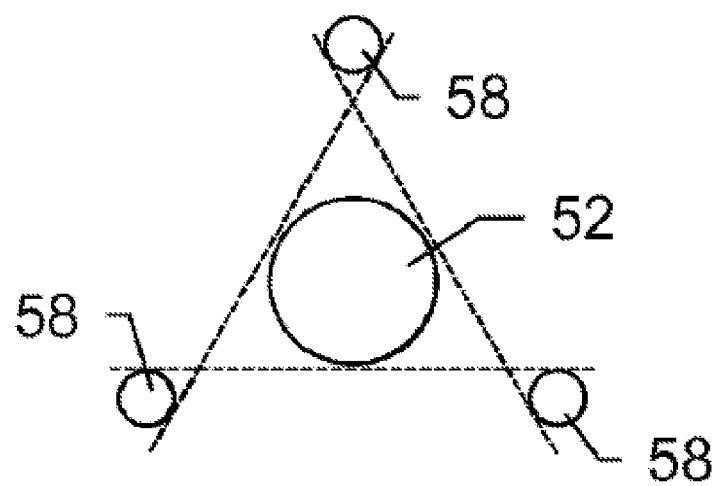
FIG. 8 shows a second embodiment according to the invention for auxiliary markings or auxiliary LEDs for the capture of a potential partial coverage of a measurement LED.

FIG. 8 shows a second embodiment according to the invention of a measurement LED 52 having auxiliary markings or auxiliary LEDs 58 on a measuring aid object for capturing a potential partial coverage of the measurement LED 52. According to the embodiment shown, three auxiliary LEDs 58 are placed around the measurement LED 52. If one or two of the auxiliary LEDs 58 are not depicted on an image sensor, this is again a typical indication of a partial concealment of the measurement LED 52. The auxiliary LEDs are positioned in this case so that a partial coverage can be reliably captured therewith, no matter from which direction. Depending on the depiction quality of the camera optics and the image sensor, an individual "safety distance" to the measurement LED 52 can be planned in for this positioning of the auxiliary LEDs 58.

For a check of whether the ring-shaped auxiliary marking 56 according to FIG. 7 and/or the auxiliary LEDs 58 according to FIG. 8 are covered, according to a special embodiment, a checking method according to the invention or a checking functionality can be executed to compare an item of image information relating to the auxiliary marking 56 and/or the auxiliary LEDs 58 to a consideration criterion. The consideration criterion is especially adapted for this purpose to the design and/or the arrangement of the auxiliary marking 56 and/or the auxiliary LEDs 58 in particular.

It is obvious that these illustrated figures only schematically show possible exemplary embodiments. The various approaches can also be combined according to the invention with one another and with methods for depicting objects or with methods for orientation determination of objects and with measuring devices of the type in question, in particular laser trackers, of the prior art.

What is claimed is:

1. A method for determining a spatial orientation of a measuring aid object, which has reference features, which are attached in a defined spatial relationship and provide light spots, for and using a laser tracker having:
   a base, which defines a standing axis,
   a support, which is pivotable by a motor about the standing axis in relation to the base,
   a pivot unit, which is rotatable by a motor about a tilt axis in relation to the support, having an image capture unit for capturing an image of the light spots,
   a radiation source for emitting a laser beam,
   a distance measuring unit for measuring the distance to the measuring aid object by means of the laser beam, and
   an angle measuring functionality for determining an emission direction of the laser beam in relation to the base;
   the method comprising:
   capturing an image in the direction of the measuring aid object having light spots, which can each be captured in dependence on at least one position and/or on an alignment of the measuring aid object;
   deriving a spatial orientation of the measuring aid object by means of image analysis from image positions in the image for the light spots captured in the image;
   defining a local consideration criterion with respect to an appearance of an individual light spot in the image for the image analysis or a global consideration criterion with respect to a position relationship between a number of light spots in the image is defined for the image analysis;
   performing a check of a fulfillment of the local or global consideration criterion for at least one of the light spots captured in the image; and
   if the consideration criterion is not fulfilled, weighting the at least one of the light spots captured in the image in reduced form for the derivation of the spatial orientation.

2. The method as claimed in claim 1, wherein:
   the local consideration criterion defines an image attribute for the appearance of at least the one of the light spots in the image.

3. The method as claimed in claim 1, wherein:
   the local consideration criterion defines at least one of a setpoint shape, a setpoint spatial extension, a setpoint brightness distribution, a setpoint total intensity, a setpoint contrast as the image reference.

4. The method as claimed in claim 1, wherein:
   the global consideration criterion defines a relative spatial setpoint positioning of the image positions in the image for the number of the light spots captured in the image in consideration of a respective orientation of the measuring aid object.

5. The method as claimed in claim 1, wherein:
   the global consideration criterion defines a relative spatial setpoint positioning of the image positions in the image for the number of the light spots captured in the image.

6. The method as claimed in claim 1, wherein:
   the local or global consideration criterion is derived from at least one of the captured image, a respective graphic depictions of the light spots in the image, and a comparison of the respective graphic depictions of the light spots.

7. The method as claimed in claim 1, further comprising:
capturing offset in time at least one additional image having the light spots; and
performing a check of a fulfillment of the local or global consideration criterion for at least one of the light spots captured in the additional image; and
if the consideration criterion is not fulfilled, weighting the at least one of the light spots captured in the additional image by a comparison of the appearance of the individual light spot in the additional image or by a comparison of the respective image position for the individual light spot in the additional image.

8. The method as claimed in claim 1, wherein:
performing a check of a fulfillment of the local or global consideration criterion for at least one of the light spots captured in the image includes deriving an item of graphic information from the image for the at least one of the light spots captured in the image, wherein the graphic information includes at least one of an actual shape, an actual spatial extension, an actual brightness distribution, an actual total intensity, and an actual contrast which is captured for the light spot in the image; or
for the check of the fulfillment of the global consideration criterion, an image position, which is determined by means of image processing, for the at least one of the light spots in the image, which are captured in the image, is used, in particular wherein the image position is determined by means of focus calculation in the image based on a brightness distribution.

9. The method as claimed in claim 1, wherein:
the image position is determined by means of focus calculation in the image based on a brightness distribution.

10. The method as claimed in claim 1, wherein:
performing a check of a fulfillment of the local or global consideration criterion for at least one of the light spots captured in the image is based on at least one of a spatial structure of the measuring aid object, a measurement space, a position of the measuring aid, and a position and dimensioning of a visual obstruction.

11. The method as claimed in claim 1, further comprising:
determining at least partial concealment for at least the one of the light spots captured in the image, wherein if at least partial concealment of the light spot is present, this light spot is weighted in reduced form for the derivation of the spatial orientation.

12. The method as claimed in claim 1, further comprising:
determining a comparison quality value, which specifies a degree of correspondence of consideration criterion, and an item of image information by comparing the consideration criterion and the item of image information; and
defining a confidence range for the comparison quality value, wherein the item of image information for at least the first light spot is derived from the captured image, wherein
if a presently determined comparison quality value in the scope of the check of the fulfillment of the local or global consideration criterion for the at least one of the captured light spots is provided within the confidence range, a consideration is performed, and if the determined comparison quality value is present outside the confidence range, a reduced weighting of the light spot is performed for the derivation of the spatial orientation.

13. The method as claimed in claim 1, wherein:
in the scope of the check of the fulfillment of the local or global consideration criterion for each of the light spots captured in the image, an individual residual is determined and it is checked whether the respective residuals lie within a settable expectation range, wherein if one or more residuals are present outside the expectation range, the corresponding light spot or spots are weighted in reduced form for the ascertainment of the comparison quality value are excluded for the derivation of the spatial orientation.

14. A laser tracker for the position and/or alignment determination of a measuring aid object, which has reference features, which are attached in a defined spatial relationship and provide light spots, the laser tracker comprising:
a base defining a standing axis;
a support pivotable by a motor about the standing axis in relation to the base;
a pivot unit rotatable by a motor about a tilt axis in relation to the support, having an image capture unit for capturing an image of the light spots;
a radiation source for emitting a laser beam;
a distance measuring unit for measuring the distance to the measuring aid object by means of the laser beam;
an angle measuring functionality for determining an emission direction of the laser beam in relation to the base; and
a control and processing unit having a functionality for determining a spatial orientation of the measuring aid object, upon the execution of which the spatial orientation of the measuring aid object is derived by means of image analysis from image positions in the image for light spots captured in the image, wherein, controlled by the control and processing unit, the image is captured in the direction of the measuring aid object with light spots which can each be captured in dependence on at least one position and/or on an alignment of the measuring aid object, wherein:
a local consideration criterion with respect to an appearance of an individual light spot in the image is defined for the image analysis or a global consideration criterion with respect to a position relationship between a number of light spots in the image is defined for the image analysis,
the control and processing unit has a checking functionality, upon the execution of which, for at least one of the light spots captured in the image, a check of a fulfillment of the local or global consideration criterion is performed, and
if the consideration criterion is not fulfilled, the at least one of the light spots captured in the image is excluded during execution of the functionality for the derivation of the spatial orientation.

15. The laser tracker as claimed in claim 14, wherein:
the measuring aid object is implemented such that additional auxiliary markings are arranged, which are positioned in a defined spatial relationship in relation to one of the reference features, wherein upon execution of the checking functionality, depictions of the auxiliary markings in the captured image are checked with respect to the fulfillment of the local or global consideration criterion, wherein the auxiliary markings are implemented as light-emitting diodes.

16. The laser tracker as claimed in claim 14, wherein:
the reference features of the measuring aid object are implemented as self-lighting means, which provide the light spots.

17. The laser tracker as claimed in claim 14, wherein the light spots comprise light emitting diodes.

18. A non-transitory computer program product, which is stored on a machine-readable carrier, for controlling the image capture in the direction of the measuring aid object and for executing
- capturing an image in the direction of the measuring aid object having light spots, which can each be captured in dependence on at least one position and/or on an alignment of the measuring aid object;
- deriving a spatial orientation of the measuring aid object by means of image analysis from image positions in the image for the light spots captured in the image;
- defining a local consideration criterion with respect to an appearance of an individual light spot in the image for the image analysis or a global consideration criterion with respect to a position relationship between a number of light spots in the image is defined for the image analysis;
- performing a check of a fulfillment of the local or global consideration criterion for at least one of the light spots captured in the image; and
- if the consideration criterion is not fulfilled, weighting the at least one of the light spots captured in the image in reduced form for the derivation of the spatial orientation.

* * * * *